United States Patent
Uemura

(10) Patent No.: US 8,570,665 B2
(45) Date of Patent: Oct. 29, 2013

(54) LENS BARREL HAVING CAM CYLINDER WITH CAM GROOVE

(75) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/227,053

(22) Filed: Sep. 7, 2011

(65) Prior Publication Data

US 2012/0063006 A1    Mar. 15, 2012

(30) Foreign Application Priority Data

Sep. 13, 2010 (JP) .................................. 2010-204727

(51) Int. Cl.
*G02B 15/14* (2006.01)

(52) U.S. Cl.
USPC .......................................................... 359/700

(58) Field of Classification Search
USPC .......................... 359/694, 699, 700, 701, 826
See application file for complete search history.

(56) References Cited

U.S. PATENT DOCUMENTS

| 5,818,647 A | 10/1998 | Bishio et al. | |
|---|---|---|---|
| 2004/0156127 A1 * | 8/2004 | Nomura et al. | 359/821 |

FOREIGN PATENT DOCUMENTS

| CN | 1519607 A | 8/2004 |
|---|---|---|
| CN | 101329439 A | 12/2008 |
| JP | 63-071817 A | 4/1988 |
| JP | 07-191249 A | 7/1995 |
| JP | 2004-258642 | 9/2004 |

OTHER PUBLICATIONS

The above references were cited in a Aug. 30, 2013 Chinese Office Action, a copy of which is enclosed with an English Translation, that issued in Chinese Patent Application No. 201110268757.5.

* cited by examiner

*Primary Examiner* — Joseph P Martinez

(74) *Attorney, Agent, or Firm* — Cowan, Liebowitz & Latman, P.C.

(57) ABSTRACT

A lens barrel includes a lens holding frame 102 that holds a lens 101 and that includes at least three follower pins 103, 104, and 102*b*, a guide cylinder 700 that linearly guides the lens holding frame 102 in an optical axis direction, and a cam cylinder 800 that rotates around an optical axis to move the lens holding frame 102 in the optical axis direction. At least three different kinds of cam grooves 800*a*, 800*b*, and 800*c* are formed on the cam cylinder 800, and at least two cam grooves of the cam grooves intersect with each other at a predetermined intersection 800*t*. When one of the at least three follower pins is positioned at the intersection, the other at least two follower pins engage with corresponding cam grooves of the at least three different kinds of cam grooves in a compression direction.

4 Claims, 6 Drawing Sheets

LENS BARREL HAVING CAM CYLINDER WITH CAM GROOVE

BACKGROUND OF THE INVENTION

1. Field of the Invention

The present invention relates to a lens barrel that supports a lens so as to be movable back and forth in an optical axis direction.

2. Description of the Related Art

In an optical apparatus such as a digital still camera, a function of a moving image shooting as well as a still image shooting is required similarly to the digital video camera. In the moving image shooting, a smooth zoom operation with a small image shake and a high magnification are required. However, the lens barrel gets heavier because of the high magnification, and the impact that is applied by the drop-off is large. Therefore, a lens barrel which has a resistance to an external force such as an impact is necessary. Japanese Patent Laid-Open No. 2004-258642 discloses a lens barrel in which cam grooves intersect with each other.

However, in the lens barrel of Japanese Patent Laid-Open No. 2004-258642, at an intersectional position of the cam grooves, a follower pin only engages with the other cam groove, which is relatively weak for the impact. Additionally, at the intersectional position of the cam groove, a smooth zoom operation is difficult since the cam groove that drives the follower pin is changed.

SUMMARY OF THE INVENTION

The present invention provides a lens barrel capable of performing a smooth zoom operation with a resistance to an impact force.

A lens barrel as one aspect of the present invention includes a lens holding frame that holds a lens and that includes at least three follower pins, a guide cylinder that is provided on an inner circumferential side of the lens holding frame and that linearly guides the lens holding frame in an optical axis direction, and a cam cylinder that is provided on an outer circumferential side of the guide cylinder and that rotates around an optical axis to move the lens holding frame in the optical axis direction. At least three different kinds of cam grooves are formed on the cam cylinder, and at least two cam grooves of the cam grooves intersect with each other at a predetermined intersection. When one of the at least three follower pins is positioned at the intersection, the other at least two follower pins engage with corresponding cam grooves of the at least three different kinds of cam grooves in a compression direction.

Further features and aspects of the present invention will become apparent from the following description of exemplary embodiments with reference to the attached drawings.

DESCRIPTION OF THE PREFERRED EMBODIMENTS

Figure 1:
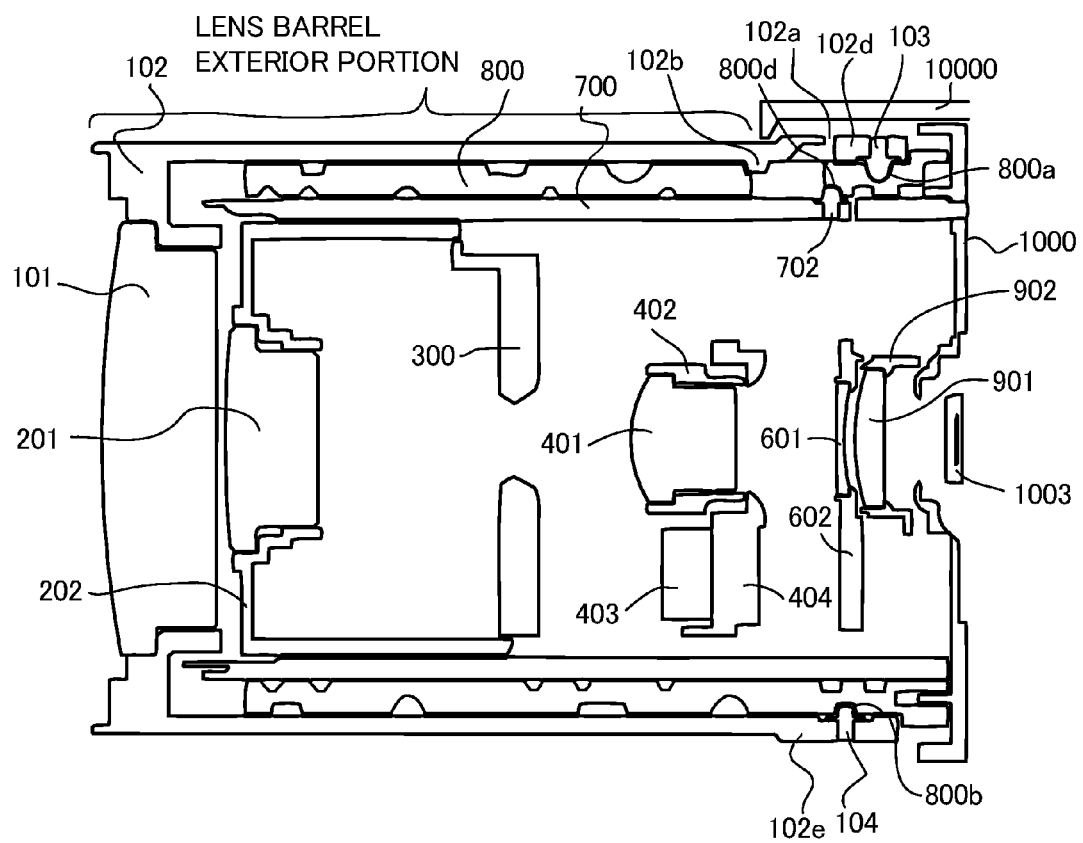
FIG. 1 is a cross-sectional view of a lens barrel in the present embodiment.

Exemplary embodiments of the present invention will be described below with reference to the accompanied drawings. In each of the drawings, the same elements will be denoted by the same reference numerals and the duplicate descriptions thereof will be omitted.

Figure 2:
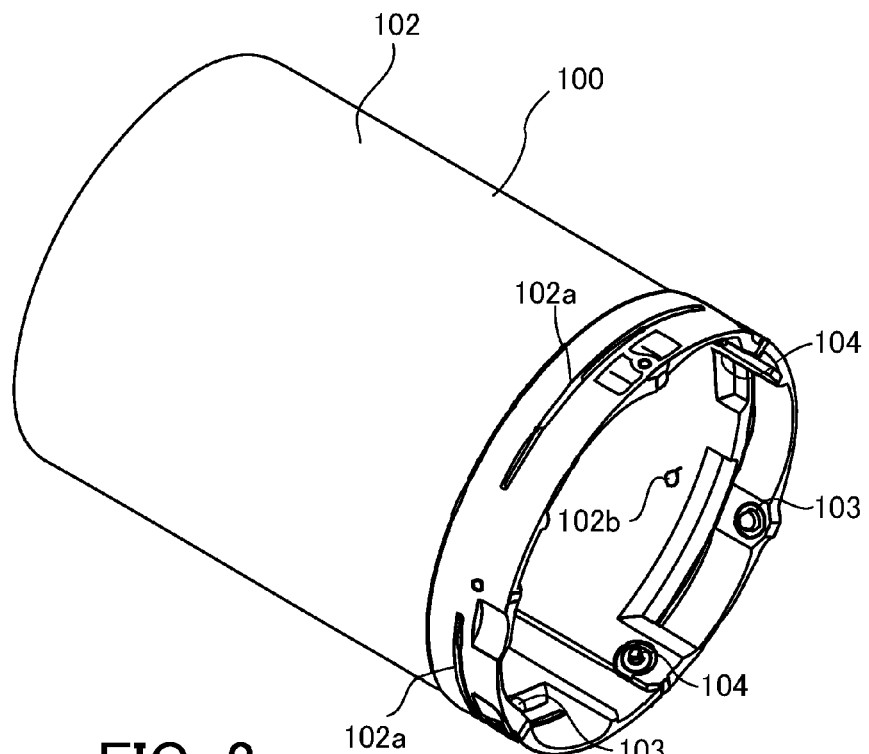
FIG. 2 is a perspective view of a lens holding frame unit in the present embodiment.

First of all, a lens barrel in the present embodiment will be described. FIG. 1 is a cross-sectional view of the lens barrel in the present embodiment. FIG. 2 is a perspective view of a lens holding frame unit in the present embodiment. In the present embodiment, the lens unit which is applied to a still camera will be described, but the present embodiment is not limited to this and is widely applicable to various kinds of lens barrels incorporated in another optical apparatus such as a video camera.

Reference numeral 101 denotes a lens (a first lens unit), and reference numeral 102 denotes a lens holding frame (a first unit cylinder) that holds the lens 101. The lens holding frame 102 is provided with slit portions 102a and follower pin holding portions 102d at three regions respectively in a circumferential direction. Reference numeral 103 denotes follower pins, which are fixed on three regions in the circumferential direction of the lens holding frame 102. The follower pin 103 includes a follower pin engagement portion 103a that is a part contacting a cam groove 800a to be engaged. Reference numeral 104 denotes auxiliary follower pins, which are fixed at three regions in the circumferential direction of the lens holding frame 102. Reference numeral 102b denotes an auxiliary follower pin. The auxiliary follower pin 102b is integrally formed on the lens holding frame 102 at an exterior portion of the lens holding frame 102 (a lens barrel exterior portion). Therefore, an attachment hole is required if the auxiliary follower pin 102b is configured separately from the lens holding frame 102. Thus, the lens holding frame 102 includes at least three follower pins of the follower pin 103, and the auxiliary follower pins 104 and 102b. A lens holding frame unit 100 (a first unit) is configured by including the first lens unit, the lens holding frame 102, the follower pin 103, and the auxiliary follower pins 102b and 104.

Reference numeral 201 denotes a second lens unit, and reference numeral 202 denotes a second cylinder. A second unit is configured by including the second lens unit 201 and the second unit cylinder 202. Reference numeral 300 denotes a stop/shutter unit. Reference numeral 401 denotes a third lens unit, reference numeral 402 denotes a third lens unit holding member, and reference numeral 403 denotes a driving unit that drives the third lens unit holding member 402 in a direction orthogonal to the optical axis. Reference numeral 404 denotes a third unit base member that holds the third lens unit holding member 402 and the driving unit 403. A third unit is configured by including the third lens unit 401, the third lens unit holding member 402, the driving unit 403, and the third unit base member 404.

Reference numeral 601 denotes a fourth lens unit, and reference numeral 602 denotes a fourth lens unit holding member that holds the fourth lens unit 601. A fourth unit is configured by including the fourth lens unit 601 and the fourth lens unit holding member 602. Reference numeral 700 denotes a guide cylinder that is provided at an inner circumferential side of the lens holding frame 102. The guide cylinder 700 is fixed on a barrel base plate 1000, which linearly guides the lens holding frame 102 in the optical axis direction. Reference numeral 702 denotes a follower pin that is provided on the guide cylinder 700, which has an end portion having a spherical R shape. The follower pin 702 is configured so as to be engageable with a cam groove 800d in a radial direction of a cam cylinder 800.

Reference numeral 800 denotes a cam cylinder. The cam cylinder 800 is provided at an outer circumferential side of the guide cylinder 700, which is configured so as to rotate (around the optical axis) with respect to the guide cylinder 700 to move the lens holding frame 102 in the optical axis direction. A cam groove 800a that the follower pin engagement portion 103a of the follower pin 103 contacts to be engaged and a cam groove 800b that the auxiliary follower pin 104 contacts to be engaged are formed at the outer circumferential side of the cam cylinder 800. The cam grooves 800a and 800b have the same trajectory, and a predetermined gap is provided between the auxiliary follower pin 104 and the cam groove 800b. The follower pin 103 engages with the cam groove 800a that is formed on the cam cylinder 800. Since the follower pin 103 is charged to be incorporated into the cam groove 800a, the follower pin holding portion 102d constitutes an elastic portion by the slit portion 102a. Because the follower pin holding portion 102d constitutes the elastic portion, the follower pin 103 is biased in a direction perpendicular to the optical axis with respect to the cam groove 800a. Therefore, the follower pin 103 can be biased into the cam groove 800a without using a specific biasing member.

A cam groove 800d is formed at the inner circumferential side surface of the cam cylinder 800, and the spherical R-shaped portion of the end of the follower pin 702 contacts a cam lower surface of the cam groove 800d. The follower pin 702 engages with the cam groove 800d in the radial direction of the cam cylinder 800, and it contacts the cam groove 800d in two directions that is the optical axis direction different from each other. Reference numeral 901 denotes a fifth lens unit, and reference numeral 902 denotes a fifth lens unit holding member that holds the fifth lens unit 901. A fifth unit is configured by including the fifth lens unit 901 and the fifth lens unit holding member 902. Reference numeral 1000 denotes a barrel base plate. Reference numeral 1003 denotes an image pickup element such as a CCD or a CMOS, which is attached to the barrel base plate 1000. The barrel base plate 1000 is a camera exterior part that covers the lens barrel.

Figure 3:
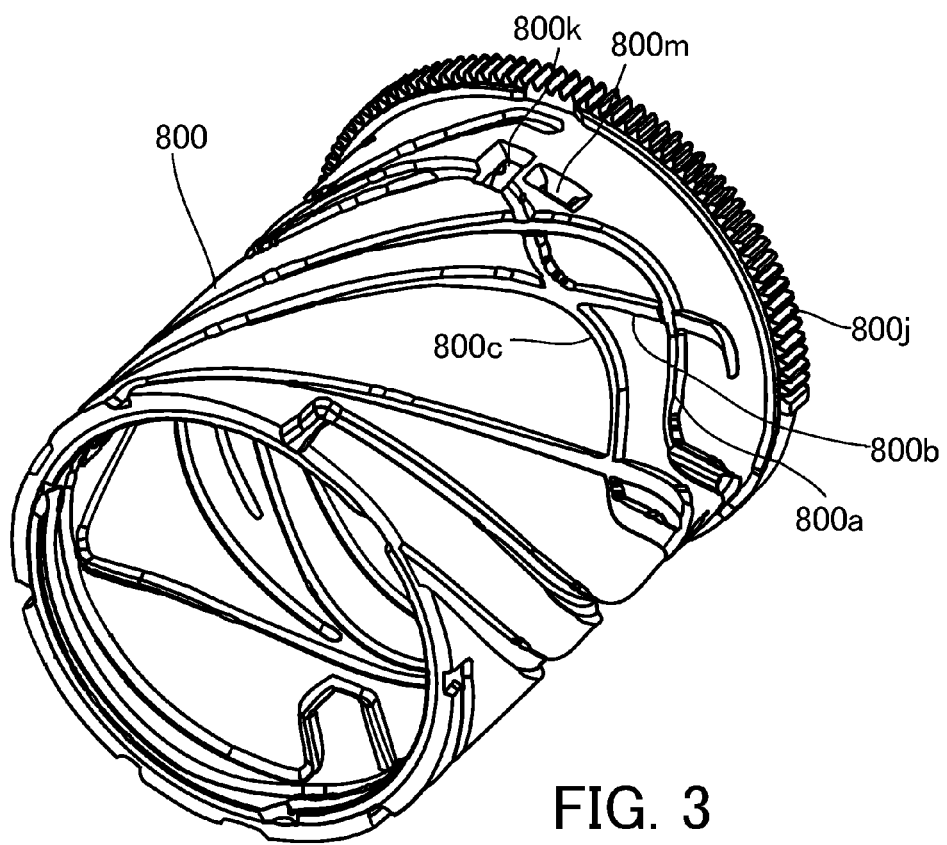
FIG. 3 is a perspective view of a cam cylinder in the present embodiment.

FIG. 3 is a perspective view of the cam cylinder 800 in the present embodiment. A cam groove 800a and auxiliary cam grooves 800b and 800c, i.e. three different kinds of cam grooves, are formed on the outer circumferential side of the cam cylinder 800. The follower pin 103 engages with the cam groove 800a that is formed on the cam cylinder 800. The auxiliary follower pin 104 engages with the auxiliary cam groove 800b that is formed on the cam cylinder 800. The auxiliary follower pin 102b engages with an auxiliary cam groove 800c that is formed on the cam cylinder 800. A gear portion 800j is provided on the outer circumferential side of the cam cylinder 800. A hole portion 800k that incorporates a cam pin (not shown) and a hole portion 800m that incorporates the follower pin 702 (a pin member) are also provided.

Figure 4:
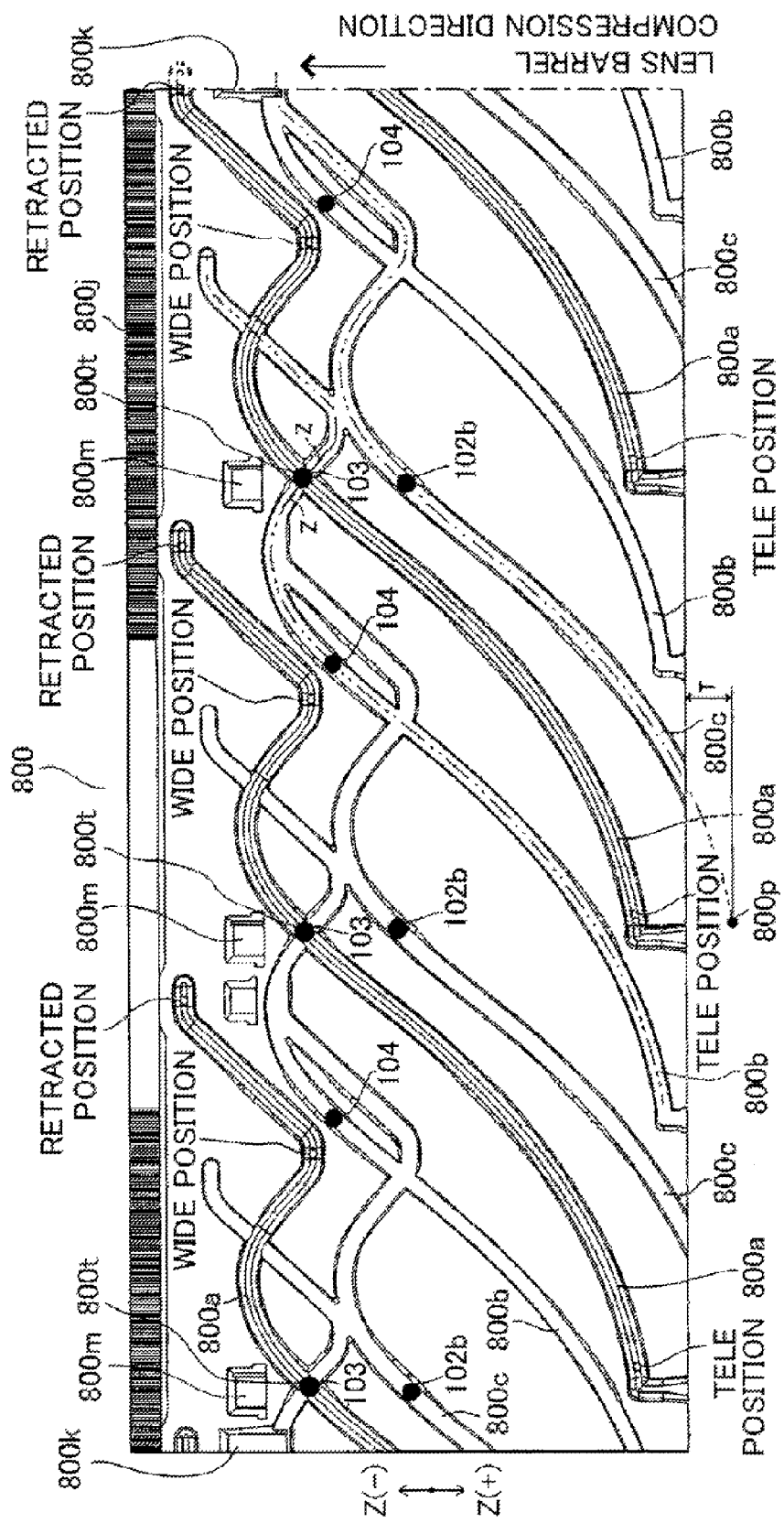
FIG. 4 is a development view of an outside diameter of the cam cylinder in the present embodiment.

FIG. 4 is a development view of an outside diameter of the cam cylinder 800 in the present embodiment. The follower pin 103 engages with the cam groove 800a at an intersection 800t (a cam groove intersectional position) in which the cam groove 800a and the auxiliary cam groove 800b intersect with each other. In this case, the auxiliary follower pins 102b and 104 engage with auxiliary cam grooves 800c and 800b respectively at a position where a cam groove exists in a direction of the image pickup element 1003 along the optical axis. The same is applied to a case in which either the auxiliary follower pin 102b or the auxiliary follower pin 104 engages with the auxiliary cam groove 800c or the auxiliary cam groove 800b at the cam groove intersectional position. In other words, when one of at least three follower pins is positioned at the intersection, the other at least two follower pins engage with corresponding cam grooves in a compression direction of the lens barrel. According to the configuration, the follower pin (the auxiliary follower pin) is not easily dropped off from the cam groove even if the lens barrel has cam grooves (the auxiliary cam grooves) intersect with each other, and therefore a lens barrel having a resistance to an impact force can be achieved. Reference numeral 800p denotes a lift end point of the auxiliary cam groove 800c. Thus, the auxiliary cam groove 800c (at least one of the cam grooves) ends in the middle of the lift. The cam groove 800a and the auxiliary cam groove 800b do not intersect with each other in the vicinity of the lift end point 800p of the auxiliary cam groove 800b. Therefore, even when the auxiliary cam groove 800c ends in the middle of the lift, the strength of the lens barrel is not influenced.

Figure 5:
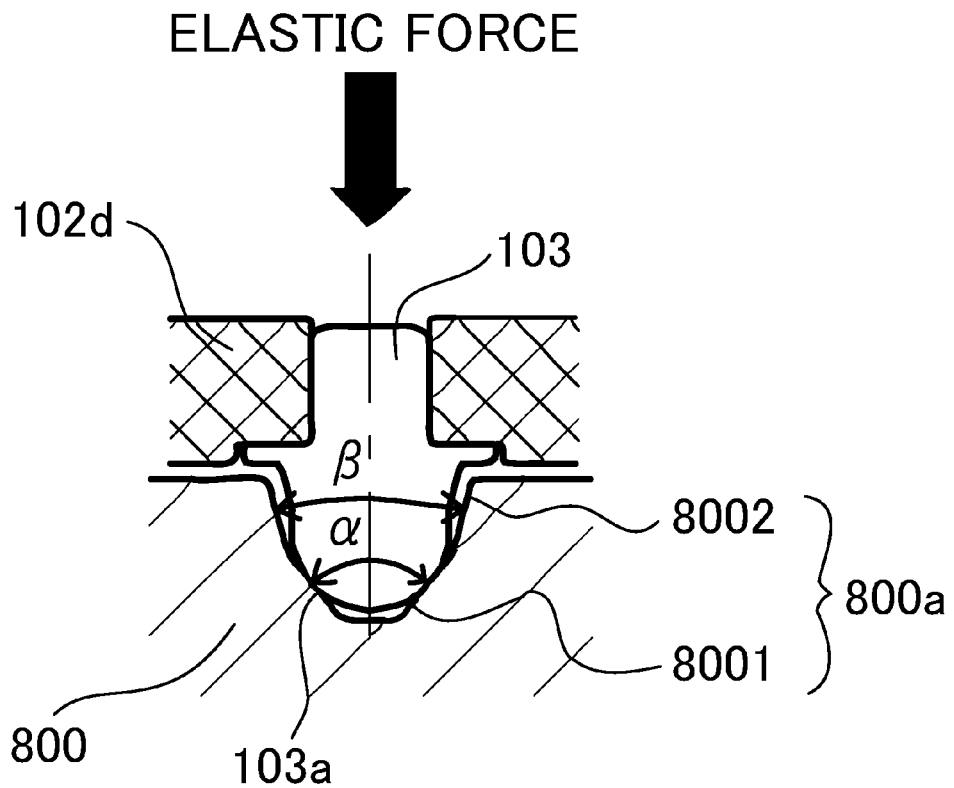
FIG. 5 is an enlarged view of a follower pin and its periphery in the present embodiment.

FIG. 5 is an enlarged view of the follower pin 103 of its periphery of the lens barrel in the present embodiment. FIG. 5 illustrates a state of the follower pin 103 when the lens holding frame 102 is not impacted. As illustrated in FIG. 5, when the lens holding frame 102 is not impacted, the follower pin 103 engages with the cam groove 800a of the cam cylinder 800. The follower pin engagement portion 103a of the follower pin 103 has a spherical shape. The spherical shape includes a shape (substantive spherical shape) that can be estimated as a substantially-spherical shape, as well as an exact spherical shape.

In the cam cylinder 800, reference numeral 8001 denotes a lower side portion of the cam groove 800a, and reference numeral 8002 denotes an open side portion of the cam groove 800a. A taper angle $\alpha$ of the lower side portion 8001 of the cam groove 800a is set to be greater than a taper angle $\beta$ of the open side portion 8002 of the cam groove 800a ($\alpha > \beta$). In other words, the cam groove 800a includes the lower side portion 8001 that has the taper angle $\alpha$ (a first taper angle) and the open side portion 8002 that has the taper angle $\beta$ (a second taper angle) smaller than the taper angle $\alpha$.

As illustrated in FIG. 5, the follower pin engagement portion 103a only contacts the lower side portion 8001 of the cam groove 800a by an elastic force of the follower pin holding portion 102d (an elastic force indicated by an arrow) during the normal driving, i.e. when the lens holding frame 102 is not impacted. In other words, the follower pin 103 contacts the lower side portion 8001 without contacting the open side portion 8002 of the cam groove 800a when the lens holding frame 102 is not impacted.

Figure 6:
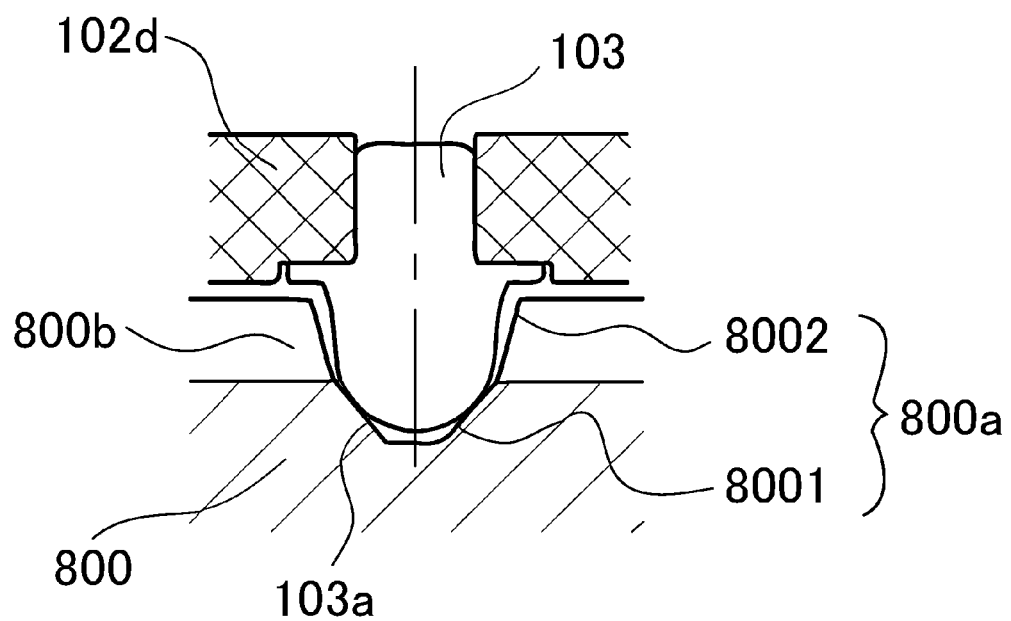
FIG. 6 is a Z-Z cross-sectional view of FIG. 4.

FIG. 6 is a Z-Z cross-sectional view in FIG. 4, which illustrates the intersectional position (the intersection 800t) of the cam groove 800a and the auxiliary cam groove 800b. The auxiliary cam groove 800b intersects with the open side portion 8002 of the cam groove 800a. On the other hand, the auxiliary cam groove 800b does not intersect with the lower side portion 8001 of the cam groove 800a. Alternatively, the auxiliary cam groove 800b intersects with the cam groove 800a only at a part of the lower side portion 8001. In other words, the cam groove 800b does not intersect with the cam groove 800a at a contact portion of the follower pin engagement portion 103a and the lower side portion 8001 of the cam groove 800a. The follower pin 103 is configured so as not to impact the zoom operation even when the cam groove 800a intersects with another cam groove (auxiliary cam groove). A slit portion 102a is formed on the lens holding frame 102 as described above. Since the follower pin 103 is charged to be incorporated into the cam groove 800a, the follower pin holding portion 102d constitutes the elastic portion by the slit portion 102a. Because the follower pin holding portion 102b functions as the elastic portion, the follower pin 103 is biased in a direction perpendicular to the optical axis with respect to the cam groove 800a. Therefore, biasing to the cam groove 800a is possible without using another biasing member.

Figure 7:
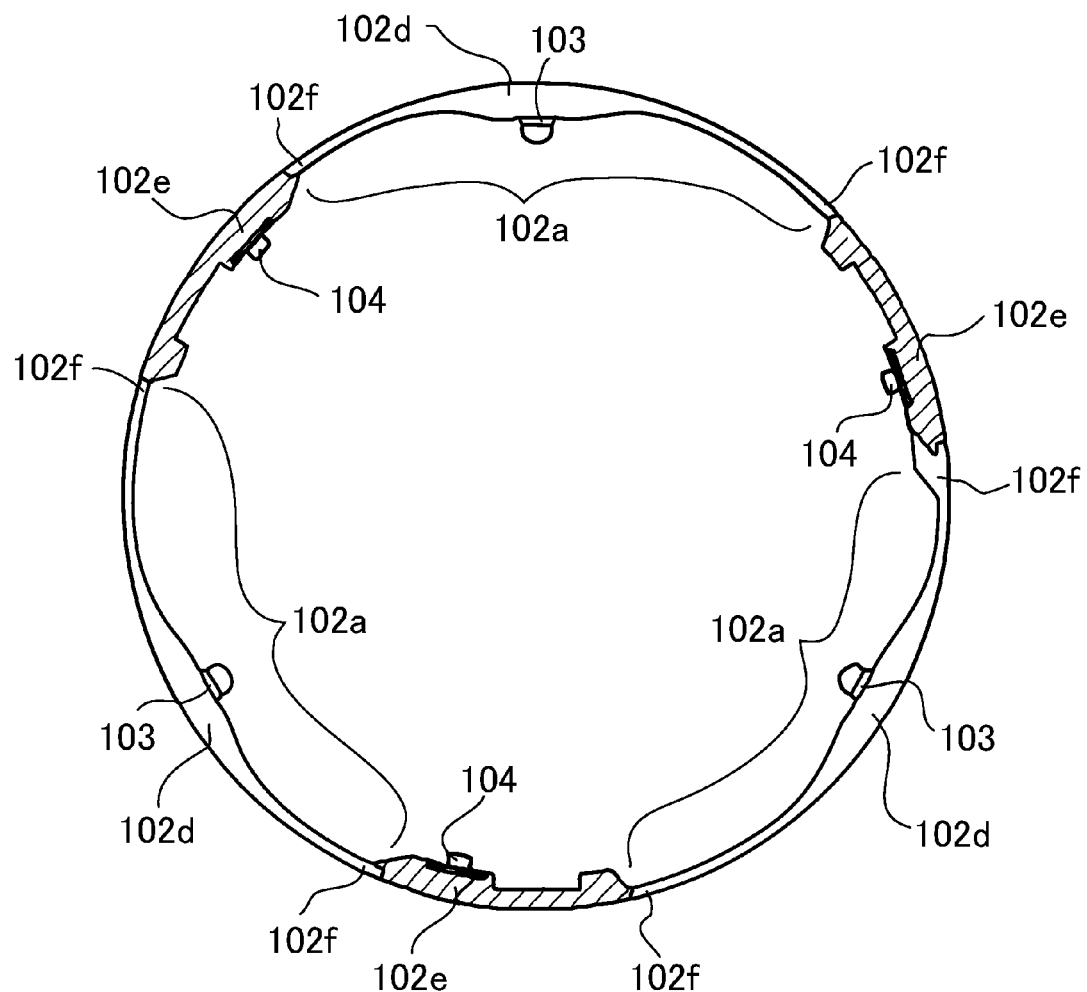
FIG. 7 is a cross-sectional view of a lens holding frame slit portion of the lens barrel in the present embodiment.

FIG. 7 is a cross-sectional view of cutting the lens holding frame 102 at the slit portion 102a when viewed from a side of the lens 101. The slit portions 102a are disposed on the lens holding frame 102 at three regions at intervals of 120 degrees. Since the follower pin holding portion 102d has to maintain the strength around the follower pin 103, it is thick. Thus, the follower pin holding portion 102d is thick to suppress the deformation and the damage caused by the impact.

A part from the follower pin holding portion 102d to a slit end portion 102f is connected with a gentle curved line, and is configured so that the stress is not locally concentrated at the time of the impact. Six gentle curved lines from the follower pin holding portion 102d to the slit end portion 102f are substantially the same curved lines. In order to ensure an appropriate elastic force, the follower pin holding portion 102d becomes thinner as it approaches both end portions of the slit portion 102a. The three follower pins 103 are configured so as to engage with the cam groove 800a by equivalent biasing forces.

The auxiliary follower pins 104 that engage with the cam groove 800b are held by auxiliary follower pin holding portions 102e among the three slit portions 102a of the lens holding frame 102. The auxiliary follower pin 104 does not contact the cam groove 800b during the normal driving. The auxiliary follower pin 104 contacts the cam groove 800b only when the lens holding frame 102 is impacted. The auxiliary follower pin holding portion 102e is configured so as to be thick in order to maintain the strength. Since the cam cylinder 800 rotates to drive the follower pin 103, the lens holding frame 102 is linearly driven in the optical axis direction without backlash.

Figure 8:
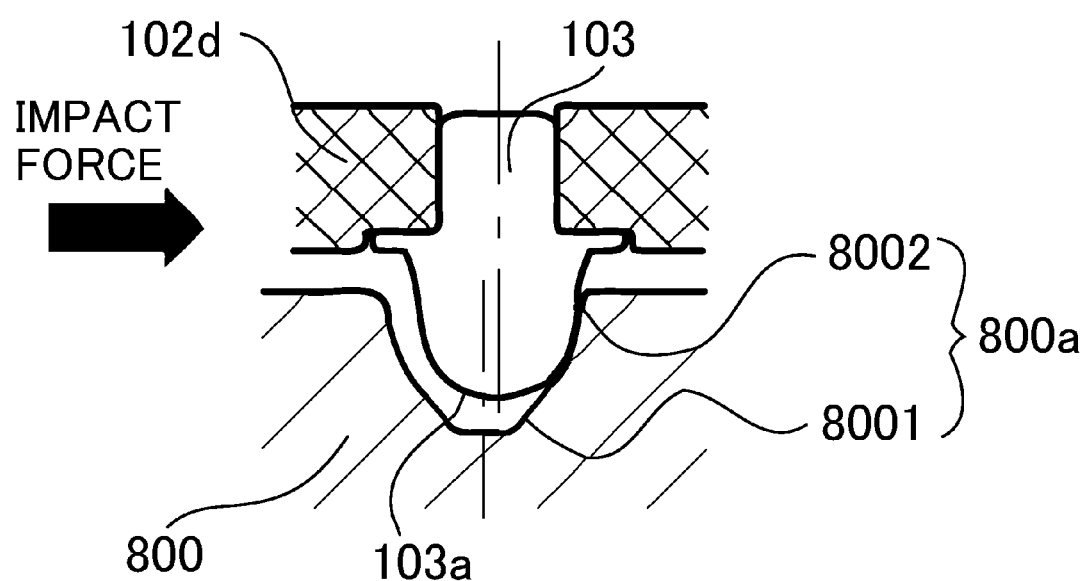
FIG. 8 is an enlarged view in the vicinity of a follower pin 103.

FIG. 8 is an enlarged view of the follower pin 103 and its periphery of the lens barrel in the present embodiment, which illustrates a state of the follower pin 103 when the lens holding frame 102 is impacted. As illustrated in FIG. 8, when the lens holding frame 102 is impacted (an impact force indicated by an arrow is applied), the follower pin 103 is dropped off from the lower side portion 8001 to contact the open side portion 8002 while pushing up the follower pin holding portion 102d. In other words, when the lens holding frame 102 impacted, the follower pin 103 contacts the open side portion 8002 without contacting the lower side portion 8001 of the cam groove 800a.

As described above, the taper angle α of the lower side portion 8001 is greater than the taper angle β of the open side portion 8002 (α>β). In addition, the shape of the follower pin engagement portion 103a is a substantive spherical shape. Therefore, the follower pin 103 is easily dropped off from the lower side portion 8001 and a dent is not easily given. The impact force transferred to the follower pin 103 is finally received by the open side portion 8002. Accordingly, the dent is easily given to the open side portion 8002. In this case, since the follower pin 103 does not contact the open side portion 8002 during the normal driving, the vibration caused by the dent is not transferred to the lens holding frame 102.

In the lens barrel of the present embodiment, when one follower pin is positioned at an intersection of cam grooves, the other follower pins engage with corresponding cam grooves of at least three different kinds of cam grooves in a direction of the image pickup element along the optical axis (a compression direction of the lens barrel). Therefore, even if the follower pin exists at the intersection when the lens barrel is impacted, the impact is applied to the other two cam grooves. As a result, a lens barrel that has a resistance to an impact force can be provided. The contact portion (the lower side portion) of the cam groove that is driven by the contact of the follower pin is not separated even when a cam groove intersects with another cam groove. Therefore, the follower pin is driven while always contacting a contact portion of the same cam groove. As a result, a lens barrel capable of performing a smooth zoom operation can be provided. In an area where at least two kinds of cam grooves do not intersect, the lift of the other cam groove can be ended. As a result, a small-sized lens barrel can be provided. Furthermore, a follower pin that is disposed at an exterior portion of the lens barrel when viewed in the optical axis direction during driving the lens barrel is integrally formed with the lens holding frame. Therefore, an attachment hole is not necessary if the follower pin is separately configured. As a result, a lens barrel without losing the design can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-204727, filed on Sep. 13, 2010, which is hereby incorporated by reference herein in its entirety.

What is claimed is:

1. A lens barrel comprising:
   a lens holding frame that holds a lens and that includes at least three follower pins;
   a guide cylinder that is provided on an inner circumferential side of the lens holding frame and that linearly guides the lens holding frame in an optical axis direction; and
   a cam cylinder that is provided on an outer circumferential side of the guide cylinder and that rotates around an optical axis to move the lens holding frame in the optical axis direction,
   wherein at least three different kinds of cam grooves are formed on the cam cylinder, and at least two cam grooves of the cam grooves intersect with each other at a predetermined intersection, and
   wherein when one of the at least three follower pins is positioned at the intersection, the other at least two follower pins engage with corresponding cam grooves of the at least three different kinds of cam grooves in a compression direction.

2. The lens barrel according to claim 1,
   wherein at least one of the cam grooves includes a lower side portion that contacts the corresponding follower pin and that has a first taper angle and an open side portion that has a second taper angle smaller than the first taper angle,
   wherein the follower pin contacts the lower side portion of the cam groove, and
   wherein the cam groove, at the intersection, intersects with another cam groove on the open side portion and does not intersect with the other cam groove on the lower side portion.

3. The lens barrel according to claim 1,
   wherein at least one of the cam grooves ends in the middle of a lift.

4. The lens barrel according to claim 1,
wherein a follower pin which is disposed at an exterior portion of the lens barrel of the at least three follower pins when viewed in the optical axis direction in driving the lens barrel is formed integrally with the lens holding frame.

\* \* \* \* \*